(12) United States Patent
O'Neill et al.

(10) Patent No.: US 7,366,152 B2
(45) Date of Patent: **\*Apr. 29, 2008**

(54) METHODS AND APPARATUS FOR SUPPORTING SESSION SIGNALING AND MOBILITY MANAGEMENT IN A COMMUNICATIONS SYSTEM

(75) Inventors: Alan O'Neill, West Hindmarsh (AU); M. Scott Corson, New York, NY (US); Vincent Park, Budd Lake, NJ (US); George Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/186,665

(22) Filed: Jul. 20, 2005

(65) Prior Publication Data

US 2005/0249176 A1    Nov. 10, 2005

Related U.S. Application Data

(63) Continuation of application No. 10/167,668, filed on Jun. 11, 2002, now Pat. No. 6,970,445.

(60) Provisional application No. 60/370,524, filed on Apr. 5, 2002, provisional application No. 60/369,016, filed on Apr. 1, 2002, provisional application No. 60/313,035, filed on Aug. 16, 2001, provisional application No. 60/298,283, filed on Jun. 14, 2001.

(51) Int. Cl.
*H04Q 7/00* (2006.01)
*H04J 3/24* (2006.01)
*G06F 15/16* (2006.01)

(52) U.S. Cl. .................. 370/338; 370/349; 455/435.1; 709/227

(58) Field of Classification Search ........ 370/315–316, 370/328, 331, 338, 349, 310.2; 455/432.1–445; 709/227–229, 238, 242
See application file for complete search history.

(56) References Cited

U.S. PATENT DOCUMENTS 5,200,952 A    4/1993  Bernstein et al.

(Continued)

FOREIGN PATENT DOCUMENTS

EP    1244261 A2    9/2002
WO    PCT/US98/47302    10/1998

OTHER PUBLICATIONS

C. Perkins, Editor "IP Mobility Support", Network Working Group, pp. 1-79 (Oct. 1996).

(Continued)

*Primary Examiner*—Chi Pham
*Assistant Examiner*—Tri H. Phan
(74) *Attorney, Agent, or Firm*—Straub & Pokotylo; Michael P. Straub; Ronald P. Straub

(57) ABSTRACT

A mobile communications system that uses IP packets to transmit data between end nodes, such as mobile devices, is described. In order to facilitate session establishment, maintenance, security, and handoff operations, access nodes through which end nodes communicate with one another include a session signaling server module and a mobility agent module. The session signaling server module may be implemented as a SIP server while the mobility agent module may be implemented using Mobil IP signaling. The mobility agent and SIP server within an access node are identified using a single shared identifier, IP address. The same security method and common secret may be used to provide security with regard to both mobile IP messages and SIP messages. Sessions admission decisions and resource allocation for admitted sessions can also take place internally to the access node of this invention without need for signaling to external elements.

24 Claims, 6 Drawing Sheets

U.S. PATENT DOCUMENTS

| | | | |
|---|---|---|---|
| 5,210,787 | A | 5/1993 | Hayes et al. |
| 5,229,992 | A | 7/1993 | Jurkevich et al. |
| 5,247,516 | A | 9/1993 | Bernstein et al. |
| 5,251,209 | A | 10/1993 | Jurkevich et al. |
| 6,078,575 | A | 6/2000 | Dommety et al. |
| 6,161,008 | A | 12/2000 | Lee et al. |
| 6,195,705 | B1 | 2/2001 | Leung |
| 6,366,561 | B1 | 4/2002 | Bender |
| 6,366,577 | B1 | 4/2002 | Donovan |
| 6,438,114 | B1 | 8/2002 | Womack et al. |
| 6,446,127 | B1 | 9/2002 | Schuster et al. |
| 6,477,150 | B1 | 11/2002 | Maggenti et al. |
| 6,487,407 | B2 | 11/2002 | Goldberg et al. |
| 6,571,095 | B1 | 5/2003 | Koodli |
| 6,611,547 | B1 | 8/2003 | Rauhala |
| 6,615,236 | B2 | 9/2003 | Donovan et al. |
| 6,650,901 | B1 | 11/2003 | Schuster et al. |
| 6,678,735 | B1 | 1/2004 | Orton et al. |
| 6,680,943 | B1 | 1/2004 | Gibson et al. |
| 6,725,036 | B1 | 4/2004 | Faccin et al. |
| 6,928,082 | B2 | 8/2005 | Liu et al. |
| 6,954,442 | B2 | 10/2005 | Tsirtsis et al. |
| 6,970,445 | B2 * | 11/2005 | O'Neill et al. ............... 370/338 |
| 2002/0024946 | A1 | 2/2002 | Jeong et al. |
| 2002/0037723 | A1 | 3/2002 | Roach |
| 2002/0122416 | A1 | 9/2002 | Xu et al. |
| 2002/0150091 | A1 | 10/2002 | Lopponen et al. |
| 2002/0152325 | A1 | 10/2002 | Elgebaly et al. |
| 2003/0045276 | A1 | 3/2003 | Bondy et al. |
| 2003/0120813 | A1 | 6/2003 | Majumdar et al. |

OTHER PUBLICATIONS

Li, Yalun "Protocol Architecture for Universal Personal Computing" IEEE Journal on Selected Areas in Communications 15(8): 1467-1476 (1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

S. Zhou et al., "A Location Management Scheme for Support Mobility in Wireless IP Networks Using Session Initiation Protocol (SIP)", 1531-2216/01 IEEE, Oct. 2001, pp. 486-491.

Andrew T. Campbell et al., "IP Micro-Mobility Protocols", ACM SIGMOBILE Mobile Computer Communication Review (MC2R), vol. 4, No. 4, pp. 34-54, Oct. 2001.

IETF, Network Working Group, Request for Comments: 3261 "SIP: Session Initiation Protocol", pp. 1-269 (printed as pp. 1-252) (Jun. 2002).

International Search report, copy of published search report from PCT/US2002/18296, Mar. 14, 2003 pp. 1-3.

* cited by examiner

METHODS AND APPARATUS FOR SUPPORTING SESSION SIGNALING AND MOBILITY MANAGEMENT IN A COMMUNICATIONS SYSTEM

RELATED APPLICATIONS

The present application is a continuation of U.S. patent application Ser. No. 10/167,668 filed on Jun. 11, 2002, now U.S. Pat. No. 6,970,445, titled "Methods And Apparatus For Supporting Session Signaling And Mobility Management In A Communications System" which claims the benefit of the following applications: U.S. Provisional Patent Application Ser. No. 60/298,283, filed on Jun. 14, 2001, titled "Location of SIP Proxy Server in Wireless Access Router"; U.S. Provisional Patent Application Ser. No. 60/369,016, filed on Apr. 1, 2002, titled: "Methods and Apparatus for Registration for SIP Services in Mobile Networks"; U.S. Provisional Patent Application Ser. No. 60/370,524, filed on Apr. 5, 2002, titled: "Methods and Apparatus for SIP Message Forwarding and Redirection"; and U.S. Provisional Patent Application Ser. No. 60/313,035, filed on Aug. 16, 2001, titled: "A Method for Controlling IP Applications During Network Changes that Result in Resource Shortages" each of which is hereby expressly incorporated by reference.

FIELD OF THE INVENTION

The present invention is directed to methods and apparatus for establishing a data communication session and, more particularly, to methods and apparatus for establishing a data communication session through an access node in a multi-node network, e.g., a cellular network in which mobile end systems communicate with each other and other end systems through access nodes.

BACKGROUND

Internet Protocol (IP) technology is designed to enable packet-switched interconnection of a heterogeneous set of computers and communication networks. A potentially diverse set of network and link layer technologies are interconnected through nodes, e.g., gateways (or routers), that provide a packet forwarding service. Information is transferred between end nodes (or hosts) as blocks of data called datagrams, where source and destination hosts are identified by fixed length addresses. Routing in IP internetworks is connectionless in nature, in that datagrams are forwarded between routers on a hop-by-hop basis using the destination address in the datagram.

Mobile IP (Ref: IETF RFC 2002) enables an IP host, also called a "mobile node" in the context of Mobile IP, to dynamically change its point of attachment to the network, yet remain contactable via a previously given "home address". To achieve this a temporary local address or "care of address" is associated with the mobile node when it visits a foreign network. In some cases the care of address is that of a "foreign agent" that assists in this process, while in other cases the care of address may be directly assigned to the mobile node. The care of address is registered back on the home network in a node referred to as the "home agent". The home agent intercepts packets destined to the home address of the mobile node and redirects the packets, by means of encapsulation and tunneling, towards the care of address associated with mobile node in the visited network. Upon delivery to the care of address, the encapsulation is removed and the original packet destined to the home address is delivered to the mobile node.

The Session Initiation Protocol (SIP) (Ref: IETF RFC 2543) enables end nodes or users to establish data communication sessions. SIP is a client/server protocol consisting primarily of request and response message exchanges. A SIP transaction typically comprises a request/response pair. SIP uses application layer routing, wherein SIP messages sent between two "user agents" may traverse through intermediate processing nodes referred to as SIP servers. SIP user agents and servers determine the next SIP node to which each message should be directed based on inspection and processing of SIP message header fields. Once the next SIP node is determined, the message is forwarded to that SIP node using normal network layer routing mechanisms. An enterprise network or Internet Service Provider may use SIP servers to assist in session establishment, enforce policies, or support user agent mobility. SIP mobility support mechanisms allow a user agent to maintain reachability by registering its present location information with a SIP server in its home network. This location information could either identify the location of the user agent or another SIP server to which request for the user agent should be sent (e.g., a SIP server in a visited network). The SIP server in the home network can then route any request for the user agent based on the presently registered location information.

Both a mobility management mechanism and a session establishment mechanism are required to support services such as Voice over IP in a cellular data network. FIG. 1 illustrates a system 100 based on a simple combination of Mobile IP and SIP. The system 100 is not necessarily prior art, but is useful for explaining Mobile IP and SIP for background purposes and therefore will be discussed here. The depicted system 100 comprises a plurality of access nodes 114, 126, where each access node 114, 126 provides connectivity to a plurality of N end nodes (160, 162), (164, 166), respectively, via corresponding access links (118, 120), (122, 124), respectively.

Interconnectivity between the access nodes 114, 126 is provided through network links 106, 108 and an intermediate network node 102. The network also includes a SIP server node 112 that is connected to the intermediate network node 102 by network link 110. The intermediate network node 102 also provides interconnectivity to another network 128 via network link 104, where the network 128 is the home network of end node X 162. The home network 128 includes a Mobile IPv4 home agent node 130 and a home SIP server node 132, each of which is connected to an intermediate network node 138 by one of two network links 134, 136, respectively. The intermediate network node 138 in the home network 128 also provides interconnectivity to network nodes that are external from the perspective of the home network 128 via network link 104. In the illustrated system 100, SIP servers 112 and 132 are physically distinct and remotely located from access nodes 114, 126 requiring external signaling between the housing of servers 112, 126 whenever either of the servers needs to interact with an access node 114, 126. As a result of the locations of server 112, 132 relative to access nodes 114, 126 undesirable delays may occur when a SIP server 112, 132 needs to interact with the elements of one of the access nodes 114, 126.

In the depicted system 100, end node X 162 uses Mobile IP to maintain reachability, while its present point of attachment to the network is through visited access node 114. End node X 162 has registered the address associated with a Mobile IPv4 foreign agent module 116 of the access node 114 as a care of address with its home agent 130 in its home network 128.

End node X 162 has also registered the location of a visited SIP server 112 with its home SIP server node 132 in its home network 128. Thus, the home SIP server 132 will direct SIP requests for end node X 162 to the visited SIP server 112. The dashed arrows show the path of a SIP request and response for a session initiated from end node Y 166 to end node X 162. End node Y 166 directs the initial request message 140 to the home SIP server 132 of end node X 162. The home SIP Server 132 subsequently directs a request message 142 to the visited SIP server 112 in accordance with the registered location information. Following reception of the request message 142 from the home SIP server 132, the visited SIP server 112 directs a request message 144 to the home address of end node X 162. This request message 144 is forwarded via normal network routing all the way back to the home network 128 of end node X 162, where it is intercepted by the home agent 130. The home agent 130 encapsulates the intercepted request message 144 and tunnels the encapsulated request message 146 to the foreign agent 116. Following reception of the encapsulated request message 146, the foreign agent 116 directs a request message 148 to end node X 162.

Following reception of the request message 148, end node X 162 sends a response to end node Y 166 such that the response traverses backwards through the same set of SIP intermediate servers that processed the request. This is accomplished in part by the fact that the information identifying the SIP servers 132, 112 through which the request traversed was added to the request message 142, 144 as it was forwarded. Thus, end node X 162 initially directs a response message 150 to the visited SIP server 112. The visited SIP Server 112 subsequently directs a response message 152 to the home SIP server 132. Following reception of the response message 152 from the visited SIP server 112, the home SIP server 132 directs a response message 154 to end node Y 166. However, the path of the response would be more circuitous in the case where Mobile IP operates in reverse tunneling mode (Ref: IETF RFC 2344). Although the alternate response signaling path is not shown in the figure, the following briefly describes the case when reverse tunneling is used. As opposed to being delivered directly to the visited SIP server 112, the response sent from end node X 162 would be encapsulated and tunneled to the home agent 130, where it would be decapsulated by the home agent 130 and directed back to the visited SIP server 112. Then from the visited SIP server 112, the SIP response signaling path would proceed as before, to the home SIP server 132, and finally to end node Y 166.

The depicted system 100 clearly illustrates the inefficient and circuitous forwarding of SIP request/response signaling associated with the establishment of a data communication session between end node Y 166 and end node X 162. System 100 also has several other deficiencies, particularly regarding session admission control, resource allocation, and mobility support. The primary difficulty with session admission control stems from the fact that the admission control and policy decision points do not coincide with the admission control and policy enforcement points. In particular, while the SIP servers 112, 132 process session establishment signaling and effectively serve as admission control and policy decision points, these servers 112, 132 are not on the path of session data traffic, and thus cannot be admission control and policy enforcement points. Note that data session traffic will not go through servers 112, 132 since these are only used for session signaling. Furthermore, since the SIP servers 112, 132 are not on the data path, they may be easily bypassed by the session signaling traffic provided that there are no additional control mechanisms. Admission control and policy enforcement can more effectively be applied in the access nodes 114,126, but this would require additional signaling between the SIP servers 112, 132 and the access nodes 114, 126 and greatly increase the complexity of the system 100. Similarly, with respect to resource allocation, since the SIP servers 112, 132 are not on the data path, the admission control decision cannot easily account for the availability of system resources to support the requested data communication session.

In a wireless communication system, information regarding the availability of resources at the access node 114, 126 and over the access links 118, 120, 122, 124 can be critical. Incorporation of access node and link resource availability information in the admission control decision in the system 100 would again require additional signaling between the SIP servers 112, 132 and the access nodes 114, 126 and again greatly increase the complexity of the system 100. Finally, supporting mobility in combination with all of the above signaling requires additional mechanisms to accommodate the movement of an end node 160, 162, 164, 166 during session establishment. In addition to increasing the complexity of the system 100, the use of additional signaling between the SIP servers 112, 132 and the access nodes 114, 126 to address these issues would also increase the latency associated with establishment of a data communication session and increase the bandwidth utilization on network links, thus reducing the practicality of the resultant system.

In view of the above discussion, it is apparent that there is a need for improved methods and apparatus for supporting end node mobility, communication session establishment and several other operations related to establishing and maintaining communications sessions in systems which use packets to transmit data.

SUMMARY OF THE INVENTION

Figure 1:
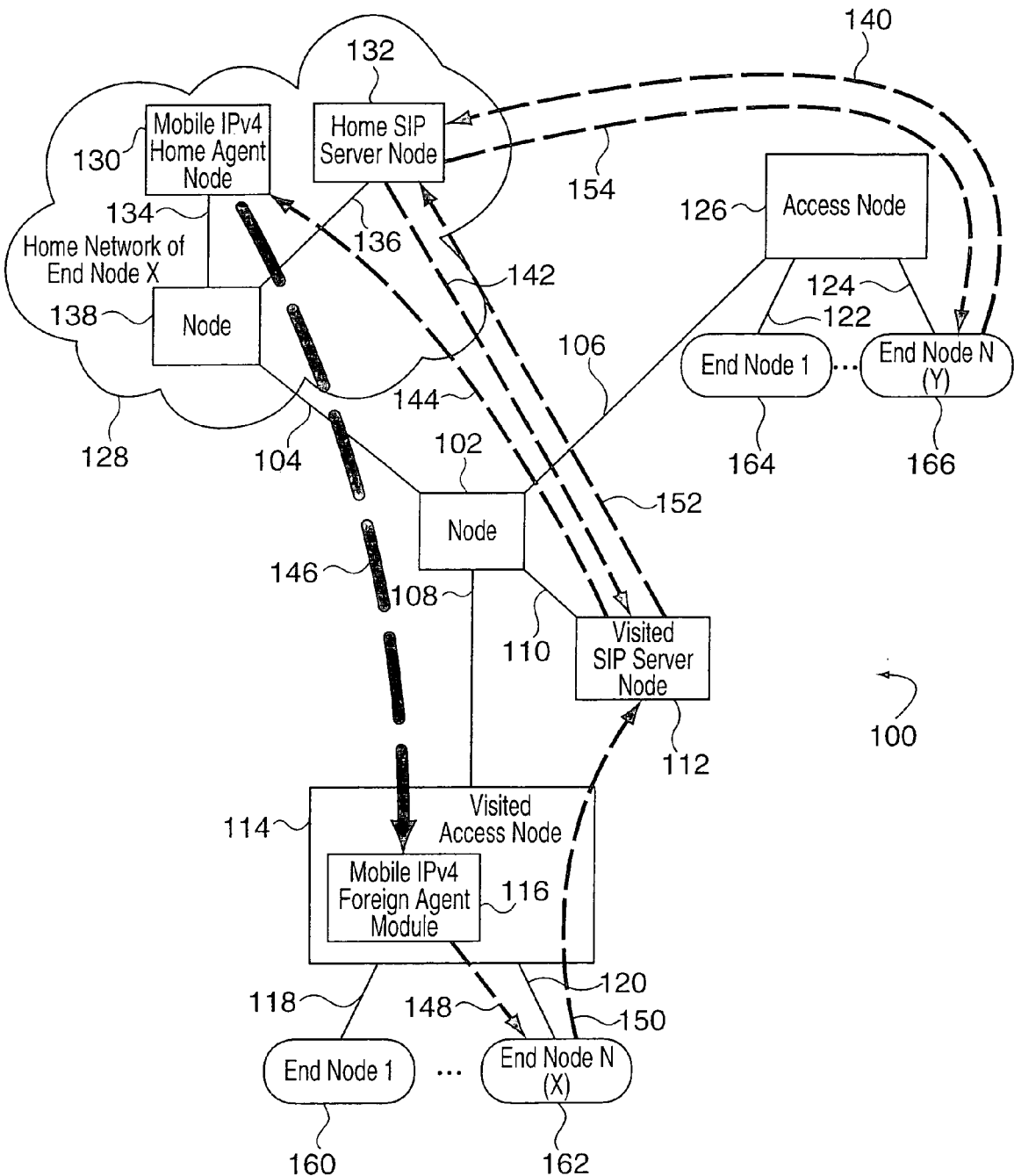
FIG. 1 illustrates one technique for using Session Initiation Protocol signaling in a mobile IP environment wherein a first mobile end node interacts with another end node via various other network elements.

Methods and apparatus of the present invention can be used to support session signaling and mobility management in a network including a plurality of end nodes that interact via a plurality of access nodes. The access nodes may be implemented as wireless access routers which include receiver and transmitter circuitry in an interface to support communications with wireless nodes via a wireless communications channel. The access nodes may be, for example, base stations in a cellular communications system. The access nodes interface may also include circuitry for coupling the access node to another node, e.g., an intermediate node used to couple two or more access nodes together.

A network implemented in accordance with the present invention includes one or more access nodes of the present invention through which end nodes can establish and conduct communications sessions. End nodes may be, for example, mobile devices which include or are IP hosts. An access node implemented in accordance with the present invention includes, within a single housing, a session signaling module in addition to a mobility agent module. An authentication module, network resource information and state information are also included in the access node in some embodiments. The session signaling module may be, e.g., a Session Initiation Protocol (SIP) server while the mobility agent module may be implemented as a Mobile IP module. The various modules comprising an access node in accordance with the invention are implemented in a fashion that allows resource and state information from each module as well as the other parts of the access node to be visible, used and/or updated by one another. This allows for a system where session initiation signaling and session mobility can be supported with less signaling between remote devices than occurs in the FIG. 1 system.

In accordance with the present invention, the session signal server module and mobility agent module may be identified to devices, e.g., nodes, external to the access node using a single common identifier, e.g., IP address. From an end node's perspective, this simplifies end node interaction with the session signal server module and mobility agent module by avoiding the need to determine and keep track of two different addresses. The access node may communicate the single common identifier to a plurality of end nodes, e.g., prior to the access node establishing a communications session including one or more of the end nodes in said plurality. The location of the session signaling server module and mobility agent module in the access node also facilitates the use of the same security method for verifying, authenticating and/or encrypting messages directed to either of the session signaling server module and mobility agent module. For example, in one embodiment the authentication module uses the same shared secret, e.g., secret value such as an authentication or encryption key, and authentication method to authenticate messages to the session signaling server module that it uses to authenticate messages to the mobility agent module. In some embodiments the shared secret is stored in the access node's memory.

In the exemplary embodiments described below the session signaling server module in an access node is used to redirect session signaling between end nodes based on state information supplied or maintained by the mobility agent module included in the same access node. The information maintained by the mobility agent module may include an address corresponding to an access node to which a mobile node is being or has been handed off. The redirection process, in some embodiments, involves signal processing such as signal reformatting. The signal processing is normally performed by the signaling server module but may be performed by one or more other modules in the access node. In this manner access nodes of the present invention can, at least in some cases, avoid long redirection paths that might otherwise occur without the presence of a concurrently located mobility management system, e.g., mobility agent module in the same device as the session signaling server module.

The co-location of session signaling module with the other modules in the access node has the additional advantage of allowing some or all local session admission and resource allocation decisions to be made without the need for signaling to elements external to the access node of the invention.

Another advantage provided by the co-location of the said modules and information in the access node of the invention is that it allows for smooth operation of session signaling even when end nodes involved in said signaling are changing access nodes through which they gain access to the network, e.g., as part of a handoff operation. This is achieved by storing state information including information about communications, settings, security, and the parameters used to communicate, service, and interact with an end node and then transferring at least some of this state information to a new access node. In accordance with the invention, all or some of the state information is exchanged between a current access node and a new access node when an end node move from the current access node to the new access node takes place, e.g., when a handoff occurs. The transfer of state information may occur when the handoff begins. As part of the handoff, the mobility agent module in the current node redirects session signaling messages directed to the current access node to the new access node, e.g., according to the state information. Thus session signaling messages can be redirected in a timely and efficient manner.

In some embodiments the mobility agent module is implemented using Mobile IP signaling. In one particular embodiment the mobility agent is implemented as a MIPv4 foreign agent while in another embodiment the mobility agent is implemented as a MIP v6 attendant.

The modules included in the access node of the invention are implemented using software, hardware or a combination of software and hardware. In the case of software implementations, the modules include different instructions or sets of instructions used to control hardware, e.g., circuitry, to implement each of the different operations performed by the module.

Numerous additional embodiments, features, and advantages of the methods and apparatus of the present invention are discussed in the detailed description that follows.

DETAILED DESCRIPTION

Figure 2:
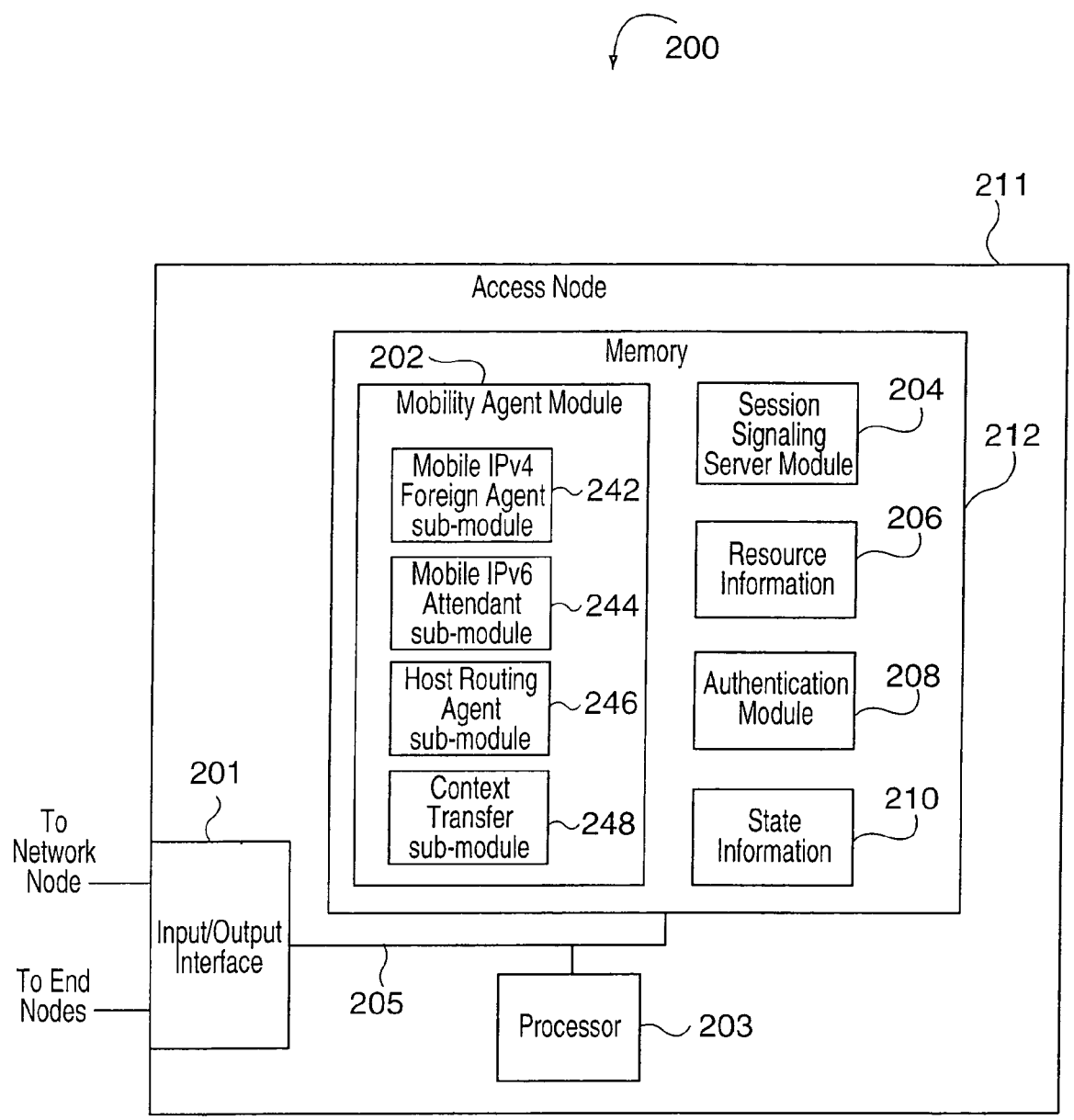
FIG. 2 illustrates an access node implemented in accordance with the present invention.

FIG. 2 illustrates an exemplary access node 200 implemented in accordance with the present invention. In the FIG. 2 embodiment, the access node 200 includes an input/output interface 201, a processor 203 and memory 212, coupled together by bus 205. The elements 201, 203, 212, 205 of access node 200 are located inside a housing 211, e.g., a case of plastic and/or metal, represented by the rectangle surrounding the node's internal elements 201, 203, 212, 205. Accordingly, via bus 205 the various components of the access node 200 can exchange information, signals and data. The input/output interface 201 provides a mechanism by which the internal components of the access node 200 can send and receive signals to/from external devices and network nodes. The input/output interface 201 includes, e.g., a receiver circuit and transmitter circuit used for coupling the node 200 to other network nodes, e.g., via fiber optic lines, and to end nodes, e.g., via wireless communications channels.

The processor 203 under control of various modules, e.g., routines, included in memory 212 controls operation of the access node 200 to perform various signaling, session admission, resource allocation, authentication, and other operations as will be discussed below. The modules included in memory 212 are executed on startup or as called by other modules. Modules may exchange data, information, and signals when executed. Modules may also share data and information when executed. In the FIG. 2 embodiment, the memory 212 of access node 200 of the present invention includes a mobility agent module 202, a session signaling server module 204 and an authentication module 208 as well as resource information 206 and state information 210.

Resource information 206 includes, e.g., parameters, resource limits both internal to the access node 200 as well as on its interfaces 201, indication and/or accounting of active sessions and/or used resources and/or available resources both internal to the access node 200 as well as on its interfaces 201. State information 210 includes, e.g., parameters, communication session and/or end node status information, security information, and/or other information relating to end node interaction and/or communication with an access node and/or another device.

The session signaling server module 204 allows the access node 200 to support session initiation operations, e.g., processing of received signals or messages used for the establishment of a data communication sessions and sending of subsequent signals or messaging as required. The session signaling server module 204 also supports session maintenance and termination services. During a session initiation operation as part of an admission control step the session signaling server may take into account and keep track of available resources. Thus, the session signaling server may access and update the resource information 206, which is kept in memory 212, e.g., information on available remaining bandwidth not allocated to active sessions.

The mobility agent module 202 allows the access node 200 to support end node mobility and connectivity management services. Thus, the access node 200 is capable of providing node mobility, session establishment, and session maintenance services to connected end nodes. The mobility agent module 202 may be implemented in a plurality of ways. In the FIG. 2 embodiment it is implemented with a collection of sub-modules. As illustrated, the mobility agent module 202 includes sub-modules 242, 244, 246, which operate as a Mobile IPv4 Foreign Agent, a Mobile IPv6 Attendant, and a Host Routing Agent, respectively. By including sub-modules 242, 244 the mobility agent module 202 is capable of supporting multiple versions of Mobile IP signaling including Mobile IPv4 and Mobile IPv6 signaling. In various embodiments, the mobility agent module 202 includes a subset of the sub-modules 242, 244 and 246 shown in FIG. 2. For example, in embodiments where Mobile IPv6 is not required, the mobile IPv6 Attendant sub-module 244 may be omitted.

As shown in FIG. 2, the exemplary mobility agent module 202 includes a context transfer sub-module 248 used to perform information, e.g., state, transfer operations as part of a handoff. As part of a handoff operation executed by the mobility agent module 202 when an end node changes its point of connection from the access node 200 to another access node, or vice versa, the context transfer sub-module 248 performs an operation to support the transfer of state information 210 regarding the end node from one access node to the next. The state information 210 that is transferred includes state information provided by other modules in memory 212. In particular, the state information 210 includes data communication session state and session establishment state provided by the session signaling server module 204, as well as authentication state and other security related state provided by the authentication module 208. In the present context "state" is used to broadly refer to information about a state, e.g., of a device, node, or communications session. In alternative embodiments of the invention the mobility agent module 202 may also include additional sub-modules to support a number of mobility related functions that improve the performance of handoff and minimize service disruption. In another alternative embodiment equivalent context transfer functionality may be implemented as a separate module in memory 212, as opposed to a sub-module of the mobility agent module 202.

The authentication module 208 included in memory 212 of the access node 200 is capable of authenticating messages and signals from other network nodes and end nodes connecting to the access node 200 via the input/output interface 201. The authentication module 208 also provides authentication services to other modules and sub-modules included in the memory 212 of the access node 200. Thus, the authentication module 208 can check the validity of messages and signals received by other modules and sub-modules in memory 212, e.g., the session signaling server module 204. Authentication module functionality can be incorporated directly into other modules or sub-modules instead as a separate module 208.

Incorporating a session signaling server module 204, mobility agent module 202, and authentication module 208 inside the housing 211 of an access node 200 where resource information 206 and state information 210 can be easily accessed, provides significant advantages in terms of signaling complexity associated with session establishment and maintenance over the FIG. 1 system.

While shown as software module in the FIG. 2 implementation, each of the modules 204, 202, 208, and sub-modules included therein, can be implemented using hardware, software or a combination of software and hardware. For purposes of the invention described herein, references to modules or sub-modules are to be understood as software, hardware or a combination of software and hardware that performs the functions of the described module or sub-module.

In accordance with one particular embodiment of the present invention, the session signaling server module 204 is a SIP (Session Initiation Protocol) server. In a particular embodiment, the access node 200 is implemented as a wireless access router that supports forwarding of IP (Internet Protocol) datagrams. In such an implementation input/output interface 201 includes circuitry, e.g., receiver/transmitter circuitry, that allows end nodes to connect to the access node 200 using wireless communications technology, e.g., via wireless communications channels. In one such implementation the coverage area of the access node is called a communication "cell". In alternative embodiments, the session signaling server module 204 sends, receives and processes signal based on other protocols such as the Resource Reservation Protocol (RSVP). In some embodiments the session signaling server module 204 supports both SIP and RSVP signaling. In some embodiments the input/output interface 201 includes circuitry that allows end nodes to connect to it via wired, wireless or a combination of wired and wireless communications technologies.

Figure 3:
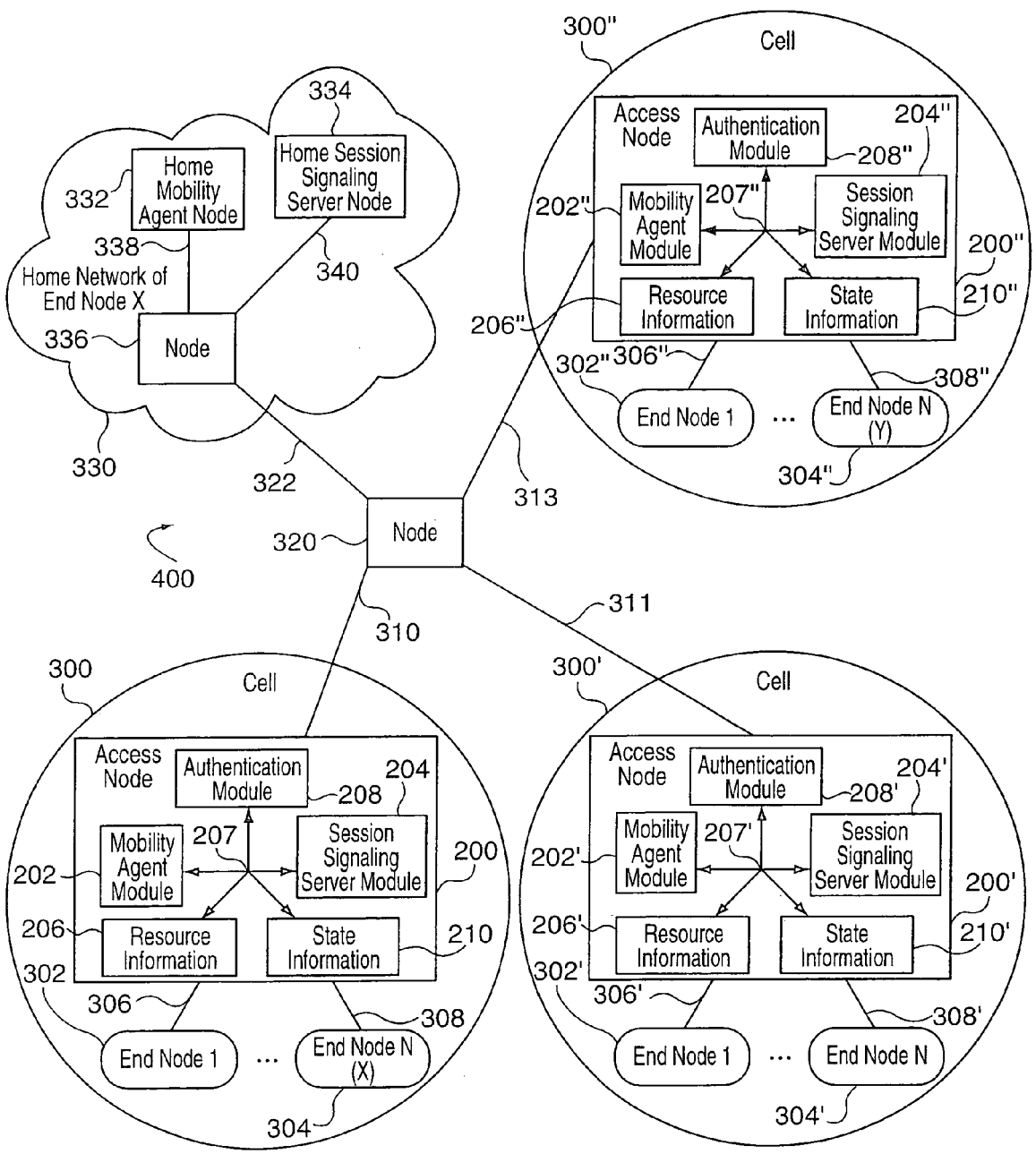
FIG. 3 illustrates a network diagram of a communications system implemented in accordance with an exemplary embodiment of the invention.

FIG. 3 illustrates an exemplary system 400 that comprises a plurality of access nodes 200, 200', 200" implemented in accordance with the present invention. FIG. 3 also depicts communication cells 300, 300', 300" surrounding each access node 200, 200', 200", respectively, which represents the coverage area of corresponding access node 200, 200', 200", respectively. The same physical and functional elements are depicted in each of the communication cells, thus the following description of the elements in the cell 300 surrounding access node 200 is directly applicable to each of the cells 300, 300', 300". The depiction of the access node 200 is a simplified representation of the access node 200 depicted in FIG. 2. The illustration of the access node 200 in FIG. 3 depicts the mobility agent module 202, session signaling server module 204, authentication module 208, resource information 206 and state information 210, while some other elements are not shown. A set of arrows 207 is used to represent the exchange of data, information, and signals between the depicted elements when they are executed. While the input/output interface 201 is not shown in FIG. 3, connectivity between access node 200 and other network nodes is shown and is subsequently further described. FIG. 3 illustrates the access node 200 providing connectivity to a plurality of N end nodes 302, 304 via corresponding access links 306, 308.

Interconnectivity between the access nodes 200, 200', 200" is provided through network links 310, 311, 313 and an intermediate network node 320. The intermediate network node 320 also provides interconnectivity to another network 330 via network link 322, where the network 330 is the home network of end node X 304. The home network 330 includes a home mobility agent node 332 and a home session signaling server node 334, each of which is connected to an intermediate network node 336 by one of two network links 338, 340, respectively. The intermediate network node 336 in the home network 330 also provides interconnectivity to network nodes that are external from the perspective of the home network 330 via network link 322.

The home mobility agent node 332 in the system 400 allows end node X 304 to maintain reachability as it moves between access nodes 200, 200', 200". The home mobility agent node 332 is responsible for redirecting packets to the current location of end node X 304 by maintaining a mapping between the home address and an address associated with the access node through which end node X 304 is current connected. The home session signaling server 334 in the system 400 provides session signaling and redirection services to facilitate establishment of data communication sessions to end node X 304.

Alternative embodiments of the invention include various network topologies, where the number and type of network nodes, the number and type of links, and the interconnectivity between nodes differs from that of the system 400 depicted in FIGS. 3 to 6.

Figure 4:
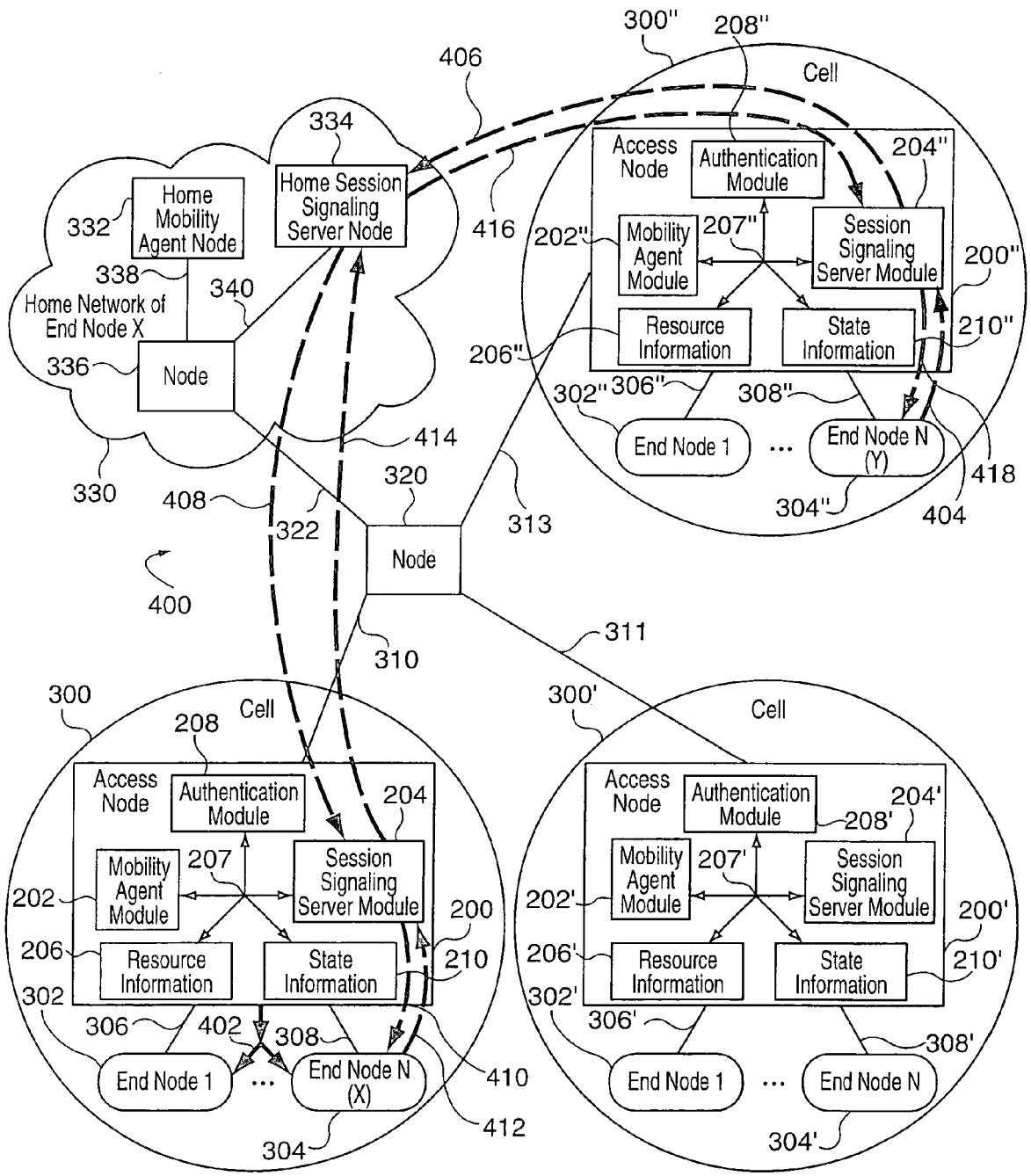
FIG. 4 illustrates signaling performed in the exemplary system shown in FIG. 3 as part of the processes of initiating and conducting a data communication session between a first mobile end node and another end node in accordance with an exemplary embodiment of the invention.

FIG. 4 illustrates the signaling performed in the exemplary system 400 shown in FIG. 3 as part of the processes of initiating and conducting a data communication session between a first mobile end node X 304 and second end node Y 304" in accordance with an exemplary embodiment of the invention. The following description of how end nodes 302, 304 obtain service through access node 200, including the methods for authentication and discovery of an identifier, e.g., address, is representative of similar operations that may be performed by end nodes (302, 304), (302', 304'), (302", 304") and the corresponding access node 200, 200', 200", respectively. In order to obtain service through the access node 200, end nodes 302, 304 perform various signaling and other operations when they enter the coverage area of an access node 200. The specific details of these signals and operations vary depending on the underlying communication technology and protocols used. In the FIG. 4 embodiment of this invention, an authentication module 208 in an access node 200 uses an end node specific secret value to authenticate signals, e.g., messages, received from an end node 302, 304 during an initial access phase and uses the same secret value to validate messages subsequently received by other modules, e.g., the session signaling server module 204. In addition to using the same secret value, the authentication module 208 may also use the same method to perform the authentication operation for messages received by the various modules.

In the FIG. 4 embodiment of this invention, the mobility agent module 202 and session signaling server module 204 each of which is included in the access node 200, can be contacted using the same identifier. The identifier may be, e.g., an IP address associated with both modules 202, 204. According to this invention the shared identifier, e.g., address, is made known to the end nodes 302, 304 within the coverage area of access node 200 by sending a signal, e.g., message 402 from the access node 200 to the end nodes 302, 304. Similarly, end nodes in the exemplary system 400 receive this identifier, e.g., address, information from their corresponding access node through which they access the communications system 400. In one particular embodiment of this invention an access node 200 periodically broadcasts a signal, e.g., message 402, including the identifier, e.g., address, information. In alternative embodiments an end node 302, 304 solicits the identifier, e.g., address, information by sending a signal, e.g., message, when it enters the coverage area of an access node 200. The access node 200 then responds by sending a signal, e.g., message, including the requested identifier, e.g., address, information to the end node. An access node 200 may also use a combination of the two methods, in which case access node 200 periodically broadcasts a signal, e.g., message, including the identifier, e.g., address, information and also responds to specific solicitations from end nodes 302, 304.

In the FIG. 4 illustration, end node Y 304" initiates establishment of a data communication session with end node X 304. End node Y 304" first sends a request session signaling message 404 to end node X 304 via the session signaling module 204" in the access node 200". While the request message 404 is directed to the session signaling module 204", the request message 404 also identifies end node X 304 as the target of session establishment request. The session signaling module 204" in access node 200" receives the request message 404, adds its own identifier, e.g., address, to the request message and redirects the request message 406 to the home session signaling server 334 of the end node X 304. The home session signaling server 334 receives the request message 406, adds its own identifier, e.g., address, to the request message and redirects the request message 408 to the currently registered location of end node X 304, which is the session signaling module 204 in access node 200 to which end node X 304 is connected.

Following reception of the request message 408 from the home session signaling server 334, the session signaling module 204 in access node 200 accesses state information 210 associated with the mobility agent 202 to control redirection of the request message. Since the state information 210 indicates that end node X 304 is directly connected via access link 308; the session signaling server module 204 does not have to direct the request message to the home mobility agent 332 of end node X 304. Instead it adds its own identifier, e.g., address, to the request message 408 and delivers the request message 410 directly to end node X 304 over access link 308.

Following reception of the request session signaling message 410, end node X 304 sends a response session signaling message 412 back to end node Y 304". The response message 412 from end node X 304 to end node Y 304" takes the reverse path specified by the list of identifiers, e.g., addresses, of intermediate session signaling nodes included in the received request message. In particular, the response message 412 is sent from end node X 304 to the session signaling module 204. Session signaling server module 204 sends the response message 414 to home session signaling server node 334, which sends the response message 416 to session signaling server module 204" in access node 200". The session signaling server module 204" in access node 200" then sends the message 418 to end node Y 304", which completes the session signaling transaction.

According to this invention since the session signaling server modules 204, 204" in the access nodes 200, 200", respectively, are in the session signaling path, they have access to the information in the session signaling message that describe the session's resource requirements. Resources such as a minimum bandwidth on the access link may be required for sessions to operate appropriately. Additionally, the session signaling modules 204, 204" have access to the current access node load levels and local policy contained in resource information 206, 206" and state information 210, 210". Based on this information the session signaling servers 204, 204" in the access nodes 200, 200" can admit or reject the session that end node X and end node Y attempt to establish. If a session is admitted, the session signaling server modules 204, 204" reserve these resources in the access nodes 200, 200".

Figure 5:
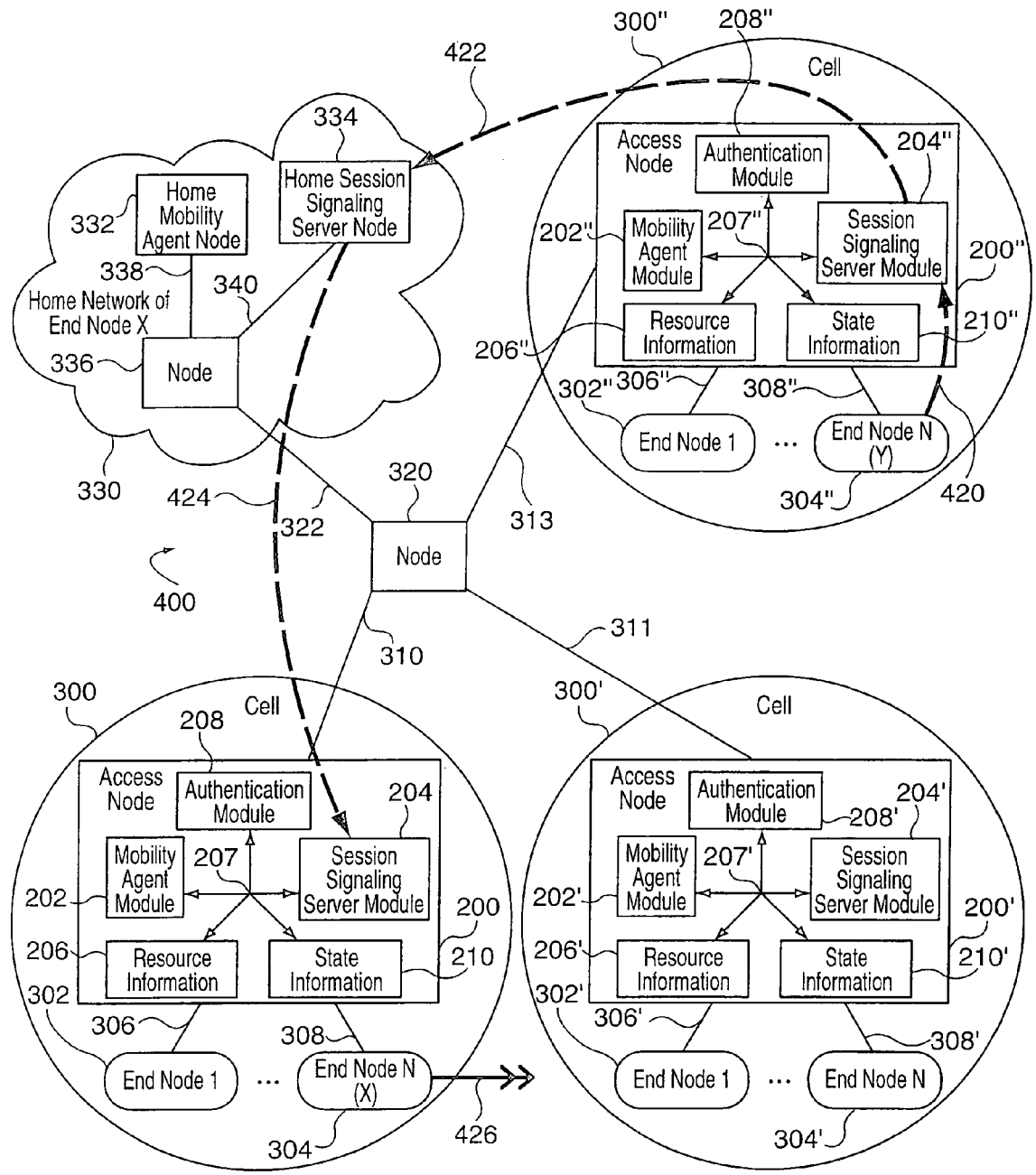
FIGS. 5 and 6 illustrate signaling performed in the exemplary system shown in FIG. 3 as part of the process of initiating and conducting a data communication session between a first mobile end node and another end node in accordance with an exemplary embodiment of the invention, while the first mobile end node is in the process of a handoff between two access nodes.
Figure 6:
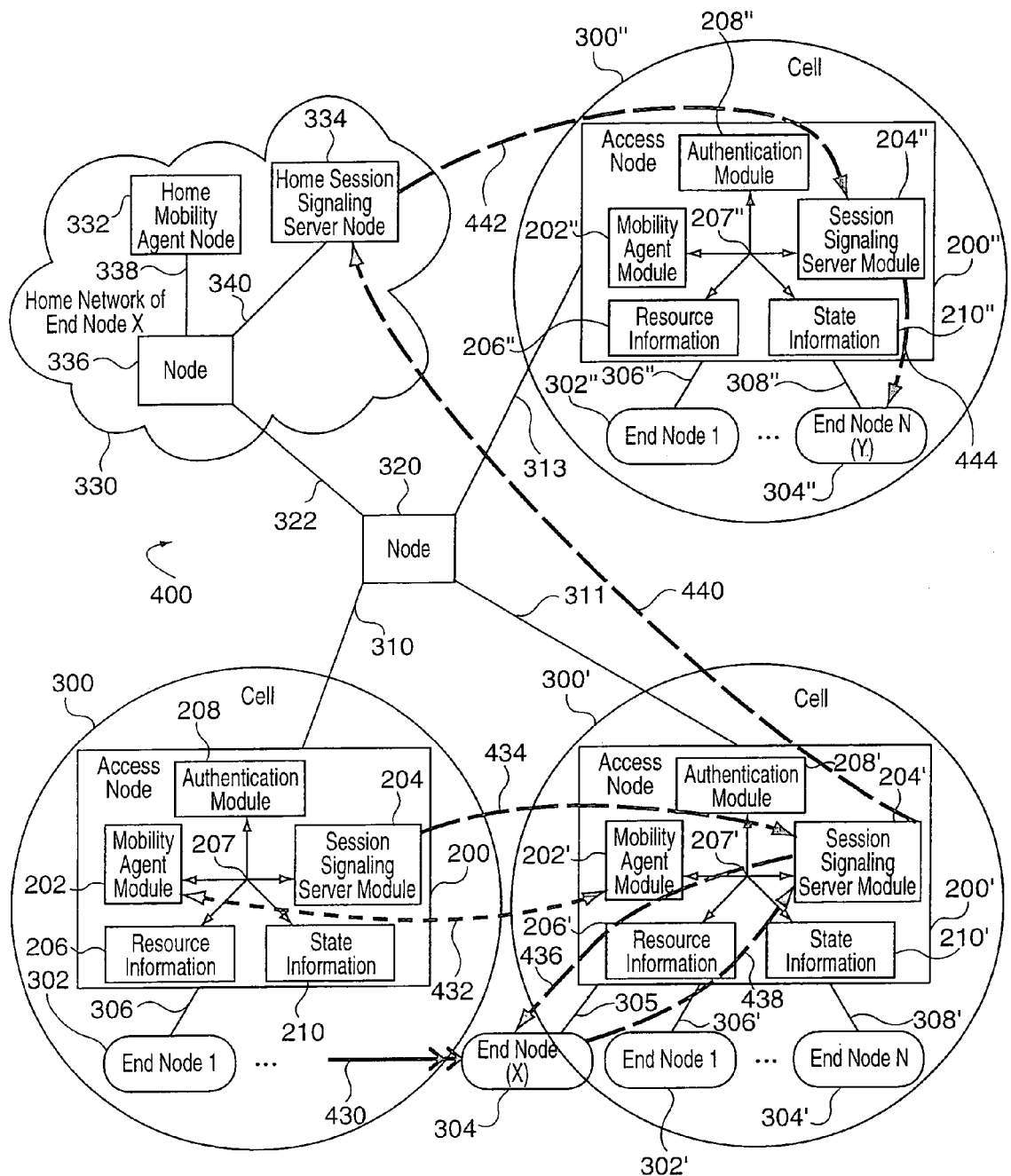

In the exemplary embodiment of this invention end node X 304 is mobile and thus can at any time move between the communication cells 300, 300', 300". FIGS. 5 and 6 illustrate signaling performed in the exemplary system 400 shown in FIG. 3 as part of the processes of initiating and conducting a data communication session between a first mobile end node X 304 and second end node Y 304" in accordance with an exemplary embodiment of the invention while the target end node X 304 is in the process of handing off between a first access node 200 and a second access node 200'. The movement of end node X 304 in FIGS. 5 and 6 is depicted with a double arrow 426, 430 in each figure, respectively. For illustration purposes FIGS. 5 and 6 depict the signaling and interaction between nodes according to an exemplary timing of events described below. Similar but not necessarily identical processes will apply if the timing of the events is modified.

As shown in FIG. 5, end node Y 304" first sends a request session signaling message 420 to end node X 304 via the session signaling module 204" in the access node 200". While the request message 420 is directed to the session signaling module 204", the request message 420 also identifies end node X 304 as the target of session establishment request. The session signaling module 204" in access node 200" receives the request message 420, adds its own identifier, e.g., address, to the request message and redirects the request message 422 to the home session signaling server 334 of the end node X 304. The home session signaling server 334 receives the request message 422, adds its own identifier, e.g., address, to the request message and redirects the request message 424 to the currently registered location of end node X 304, which is the session signaling module 204 in access node 200 to which end node X 304 is connected.

Prior to the arrival of request message 424 at the session signaling server module 204, end node X 304 changes its point attachment to the network from a first access node 200 to a second access node 200'. Note that FIG. 5 shows end node X 304 connected to the first access node 200 via access link 308, while FIG. 6 shows end node X 304 connected to the second access node 200' via access link 305. FIG. 6 illustrates a handoff operation 432 that is coordinated by the mobility agent modules 202, 202' in access nodes 200 and 200'. As part of the handoff operation 432, state information 210 associated with end node X 304 is transferred from the first access node 200 to the second 200'. Transferred information includes, for example, authentication information, shared secrets, and unique identifiers for previously admitted sessions as well as any associated session state for end node X 304 in access node 200. During and for a predetermined period of time following the handoff operation 432, the mobility agent module 202 in the first access node 200 maintains state information 210 regarding the new point of attachment of end node X 304, e.g., an identifier or address of the second access node 200'. Thus, upon arrival of request message 424 from the home session signaling server 334, the session signaling module 204 in access node 200, accesses the state information 210 associated with the mobility agent 202 to control redirection of the request message. Since the state information 210 in the first access node 200 indicates that end node X 304 has changed its point of attachment to the second access node 200', the session signaling server module 204 in the first access node 200 optionally add its own identifier, e.g., address, to the request message and immediately redirects the request message 434 to the session signaling server module 204' in the second access node 200', as shown in FIG. 6. Note that in the exemplary embodiment, the session signaling server module 204 in the first access node 200 does not add its own identifier, e.g., address, to the request message 434 that is directed to the session signaling server module 204' in the second access node 200'.

Following reception of the request message 434 from the session signaling server module 204 in the first access node 200, the session signaling module 204' in the second access node 200' accesses state information 210' associated with the mobility agent 202' to control redirection of the request message. Since the state information 210' indicates that end node X 304 is directly connected via access link 305, the session signaling server module 204' does not have to direct the request message to the home mobility agent 332 of end node X 304. Instead, it adds its own identifier, e.g., address, to the request message 434 and then delivers the request message 436 directly to end node X 304 over access link 305.

Following reception of the request session signaling message 436, end node X 304 sends a response session signaling message 438 back to end node Y 304", as shown in FIG. 6. The response message 438 from end node X 304 to end node Y 304" takes the reverse path specified by the list of identifiers, e.g., addresses, of intermediate session signaling nodes included in the received request message. In particular, the response message 438 is sent from end node X 304 to the session signaling module 204'. Session signaling server module 204' sends the response message 440 to home session signaling server node 334, which sends the message 442 to session signaling server module 204" in access node 200". The session signaling server module 204" in access node 200" then sends the message 444 to end node Y 304", which completes the session signaling transaction. Recall that in the exemplary embodiment, the session signaling server module 204 in the first access node 200 did not add its own identifier, e.g., address, to the request message 434 that was directed to the session signaling server module 204' in the second access node 200' and therefore is not included in the reverse path.

While session signaling between end node Y 304" and end node X 304 is described to go via the session signaling server modules 204" and 204 in access nodes 200" and 200 and only one additional session signaling server node 334 in the network, in several embodiments of this invention the request/response messages may go through a number of other session signaling nodes in the network according to network policy and message routing.

While in the description above the session signaling server modules 204, 204" reserve the resources required directly in an alternative embodiment of this invention, end nodes 304, 304" and/or session signaling servers 204, 204" may use resource reservation protocol messages, such as RSVP messages, to reserve the resources for an admitted session. In one embodiment of the invention and during the admission phase for a given session the access node 200 generates a unique identifier and associates it with the admitted session. This identifier is unique in this access node 200 and also in any other access nodes 200' 200" to which the end node X 304 may move to during the lifetime of the session. In one particular embodiment the access node 200 ensures uniqueness of the identifier by combining a value associated with end node X 304 and another value associated with access node 200. Similarly a unique identifier is generated by access node 200" for the same session to which end node Y 304" participates.

While session request signals from the end nodes, such as signal 404 in FIG. 4 are shown as being explicitly sent directly to the session signaling server module, e.g.: 204" in FIG. 4, in another alternative embodiment of this invention the request session signaling message 404 from end node Y 200" is not directed to the session signaling module 204" in the immediate access node 200", but is instead sent to another session signaling node in the network, e.g., the home session signaling server 334 of end node X 304. In such a case the session signaling module 204" in access node 200" would intercept, e.g., snoop, the message 404 and inspect the message 404 to extract the information required so that the session can be admitted or rejected. In such an implementation, we refer to the session signaling server module 204" as a snooping session signaling module. In an alternative embodiment of this invention the snooping session signaling module also adds its identifier, e.g., address, to the message before it send the message to the next session signaling node. Responding messages will thus explicitly go through the snooping session signaling module. The same procedure is repeated at the receiving end when the request session signaling message is not directed to the session signaling module 204 in access node 200. The session signaling module 204 instead intercepts the session signaling message 408, extracts the information needed for session admission and optionally adds its own identifier, e.g., address, to the message so that response session signaling messages will go through it in an explicit manner.

Additional aspects, features, methods, apparatus and exemplary embodiments which are part of the inventive methods and apparatus to which the present patent application is directed are described in the following U.S. Provisional patent applications each of which is hereby expressly incorporated by reference into the present patent application.

1. U.S. Provisional Patent Application Ser. No. 60/298, 283, filed on Jun. 14, 2001, titled: "Location of SIP Proxy Server in Wireless Access Router".

2. U.S. Provisional Patent Application Ser. No. 60/369, 016, filed on Apr. 1, 2002, titled: "Methods and Apparatus for Registration for SIP Services in Mobile Networks".

3. U.S. Provisional Patent Application Ser. No. 60/370, 524, filed on Apr. 5, 2002, titled: "Methods and Apparatus for SIP Message Forwarding and Redirection".

4. U.S. Provisional Patent Application Ser. No. 60/313, 035, filed on Aug. 16, 2001, titled: "A Method for Controlling IP Applications During Network Changes that Result in Resource Shortages".

As a result of the above incorporation by reference, the text and figures of the listed provisional patent applications form part of the present description. It is to be understood that the reference numerals used in the text and figures of the provisional patent applications are to be interpreted in the context of the particular incorporated provisional application and are not to be interpreted as the same as any similarly numbered element or elements described in the above text or the figures which are included herein without the use of an incorporation by reference. It is to be further understood that mandatory language in the incorporated provisional applications such as "must", "only", etc., if any, is to be interpreted as being limited to the exemplary embodiments described in the provisional applications and is not to be interpreted as a limitation on the embodiments, figures, and claims of the present application which are not incorporated by reference.

Numerous variations on the above described inventions will be apparent to those of ordinary skill in the art based on the above description. Such variations are to be considered within the scope of the invention.

What is claimed is:

1. A communications method for use in a communications system including a plurality of nodes, said plurality of nodes including first and second end nodes, the method including the steps of:
   providing an access node including a session signaling server module through which the first end node can establish a data communications session with the second end node, said access node being a base station; and
   operating said access node to transmit data communications signals from said first end node to said second end node once a data communications session between said first and second end nodes is established.

2. The method of claim 1, further comprising:
   operating said session signaling server module to perform a session initiation operation.

3. The method of claim 2,
   wherein said step of operating said session signaling server module to perform a session initiation operation includes:
      operating said session signaling server module to transmit session initiation signals using Session Initiation Protocol (SIP) signaling.

4. The method of claim 3,
   wherein said access node is a first wireless access router;
   wherein said session signaling server module is a SIP server; and
   wherein the step of operating said session signal server module includes:
      transmitting a SIP message from said SIP server included in said first wireless access router to another SIP server included in said communications system.

5. The method of claim 4, wherein said another SIP server is included in a second wireless access router used to couple said second end node to said first wireless access router.

6. The method of claim 4, further comprising:
operating said first wireless access router to interact with a first plurality of mobile nodes over a wireless communications channel, said first end node being one of said plurality of mobile nodes.

7. The method of claim 6, further comprising:
operating a second wireless router including a second SIP server to interact with a second plurality of mobile nodes, said second end node being one of said second plurality of mobile nodes.

8. The method of claim 2, further comprising:
operating said session signaling server module to reserve network resources.

9. The method of claim 2, further comprising:
operating said access node to perform at least one of a session authorization and a session admission operation as part of said step of performing a session initiation operation.

10. The method of claim 2, further comprising the step of:
operating said access node to communicate with a first set of end nodes using wireless links; and
operating said access node to communicate with a second set of end nodes using a combination of wireless and wired communications links.

11. The method of claim 1, further comprising:
operating said session signaling server module to transmit SIP signals to perform a session initiation operation used to initiate a data communications session between the first end node and the second end node; and
operating said session signaling server module to transmit RSVP signals to reserve network resources for said data communications session.

12. The method of claim 9, further comprising:
operating said access node to generate a unique identifier associated with a session admitted by said access node.

13. The method of claim 12, wherein said step of operating said access node to generate a unique identifier includes combining a value associated with an end node associated with said admitted session and a value associated with said access node.

14. The method of claim 1, further comprising:
operating said session signaling server module to transmit SIP signals to perform a session initiation operation used to initiate a data communications session between the first end node and the second end node; and
operating said session signaling server module to reserve network resources for said data communications session as a function of information included in received SIP signals.

15. The communications method of claim 1, wherein said access node further includes a mobility agent module, the method further comprising:
using said mobility agent module to facilitate communication between said first and second end nodes when said first end node changes the access node through which it accesses said communications system.

16. The method of claim 15, further comprising:
prior to establishing a data communications session, communicating a single common identifier used to identify both said session signaling server module and the mobility agent module included in said access node to a plurality of end nodes included in said communications system.

17. The method of claim 16, wherein said single identifier is an Internet Protocol address.

18. The method of claim 17, further comprising:
operating said first end node to transmit data session initiation signals, including said single common identifier, to the session signaling server included in said first access node to establish a data communications session.

19. The method of claim 15, further comprising:
operating an authentication module included in said access node to perform authentication operations to authenticate messages from end nodes that attempt to communicate with either of said session signaling server module and said mobility agent module.

20. The method of claim 19, wherein said authentication module uses the same authentication method to authenticate messages from end nodes attempting to communicate with the session signaling server module that said authentication module uses to authenticate messages from end nodes to said mobility agent module.

21. A computer readable medium including computer executable instructions for controlling an access node to implement a method in a communications system including a plurality of nodes, said plurality of nodes including first and second end nodes, said access node being a base station, said access node including a session signaling server module through which the first end node can establish a data communications session with the second end node, the method comprising:
operating said session signaling server module to perform a session initiation operation; and
controlling said access node to transmit data communications signals from said first end node to said second end node once a data communications session between said first and second end nodes is established.

22. An apparatus comprising;
a processor for use in an access node, said access node being included in communications system including a plurality of nodes, said plurality of nodes including first and second end nodes, said access node being a base station, said access nods including a session signaling server module through which the first end node can establish a data communications session with the second end node, the processor configured to:
operate said session signaling server module to perform a session initiation operation; and
control said access node to transmit data communications signals from said first end node to said second end node once a data communications session between said first and second end nodes is established.

23. An access node for use in a communications system including a plurality of nodes, said plurality of nodes including first and second end nodes, the access node comprising:
a session signaling server module for performing a session initiation operation through which the first end node can establish a data communications session with the second end node;
an I/O interface module via which said access node can transmit data communications signals from said first end node to said second end node once a data communications session between said first and second end nodes is established; and
wherein said access node is a base station.

24. An access node for use in a communications system including a plurality of nodes, said plurality of nodes including first and second end nodes, the access node comprising:

session signaling means for performing a session initiation operation through which the first end node can establish a data communications session with the second end node;

I/O interface means via which said access node can transmit data communications signals from said first end node to said second end node once a data communications session between said first and second end nodes is established; and wherein said access node is a base station.

* * * * *